United States Patent
Neale et al.

(10) Patent No.: US 8,639,647 B2
(45) Date of Patent: Jan. 28, 2014

(54) RULE ANALYSIS TOOL

(75) Inventors: Michael D. Neale, Faulconbridge (AU); Toni Allan Rikkota, Kotka (FI)

(73) Assignee: Red Hat, Inc., Raleigh, NC (US)

( * ) Notice: Subject to any disclaimer, the term of this patent is extended or adjusted under 35 U.S.C. 154(b) by 590 days.

(21) Appl. No.: 12/502,000

(22) Filed: Jul. 13, 2009

(65) Prior Publication Data

US 2011/0010326 A1   Jan. 13, 2011

(51) Int. Cl.
 *G06N 5/02*   (2006.01)
(52) U.S. Cl.
 USPC ............................................................ 706/47
(58) Field of Classification Search
 USPC ............................................................ 706/47
 See application file for complete search history.

(56) References Cited

U.S. PATENT DOCUMENTS

2010/0205134 A1*  8/2010  Sandholdt et al. .............. 706/47

OTHER PUBLICATIONS

Hall et al ("The 2006 BPTrends Reports on Business Rules Products" Apr. 2006).*
Proctor et al ("Drools Documentation" Feb. 2008).*
Anca Ioana ANDREESCU ("Methodological approaches based on business rules" 2008).*
Jesper Ohlsson ("Enforcing Business Rules in E-Business Systems a Survey of Business Rule Engines" 2006.*

* cited by examiner

*Primary Examiner* — Lut Wong
(74) *Attorney, Agent, or Firm* — Lowenstein Sandler LLP (57) ABSTRACT

Some embodiments of a rule analysis tool have been presented. In one embodiment, a user interface of a rule analysis tool receives a set of one or more user-written rules from a user. The rule analysis tool, running on a server, applies a set of one or more predefined evaluation rules to the user-written rules to evaluate the user-written rules. The predefined evaluation rules may include a logic rule, a meta-rule, etc. In some embodiments, an output module of the rule analysis tool generates an evaluation report on the set of one or more user-written rules.

24 Claims, 7 Drawing Sheets

RULE ANALYSIS TOOL

TECHNICAL FIELD

Embodiments of the present invention relate to rule management, and more specifically to providing a rule analysis tool for quality assurance and testing.

BACKGROUND

Artificial Intelligence (A.I.) is a very broad research area that focuses on "making computers think like people" and includes disciplines like neural networks, genetic algorithms, decision trees, frame systems, and expert systems. Knowledge representation is the area of A.I. concerned with how knowledge is represented and manipulated. Expert systems use knowledge representation to facilitate the codification of knowledge into a knowledge-base, which can be used for reasoning, i.e., this knowledge-base is operable to process data to infer conclusions. Expert systems are also known as knowledge-based systems or knowledge-based expert systems, and are considered applied artificial intelligence. The process of developing with an expert system is knowledge engineering.

Generally speaking, a rule is a logical construct for describing the operations, definitions, conditions, and/or constraints that apply to some predetermined data to achieve a goal. For example, a business rule might state that no credit check is to be performed on return customers.

Typically, a rule engine includes a suite of software modules or components that manages and automates the rules to implement the expert system. For instance, the rule engine evaluates and fires one or more rules based on the evaluation of the data against the rules. One advantage of a rule engine is the separation of the rules from the underlying application code. For many applications, the rules change more frequently than the rest of the application code. With the rules separated from the application code, the rule engine allows business users to modify the rules frequently without the help of technical staff and hence, allowing the applications to be more adaptable with the dynamic rules.

In general, rules are written in rule languages, which are typically easier for business users to master than programming code. However, to evaluate and verify the rules written, business users currently have to rely on tools written in programming code. Thus, it is difficult for business users to create rule evaluation tools that are specific for their particular application.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a rule analysis tool. In one embodiment, a user interface of a rule analysis tool receives a set of one or more user-written rules from a user. The rule analysis tool applies a set of one or more predefined evaluation rules to the user-written rules to evaluate the user-written rules. In some embodiments, an output module of the rule analysis tool generates an evaluation report on the set of one or more user-written rules. The predefined evaluation rules may include a logic rule, a meta-rule, etc. In some embodiments, logic rules are non-user specific, whereas meta-rules are user-specific. More details of some embodiments of the rule analysis tool are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1:
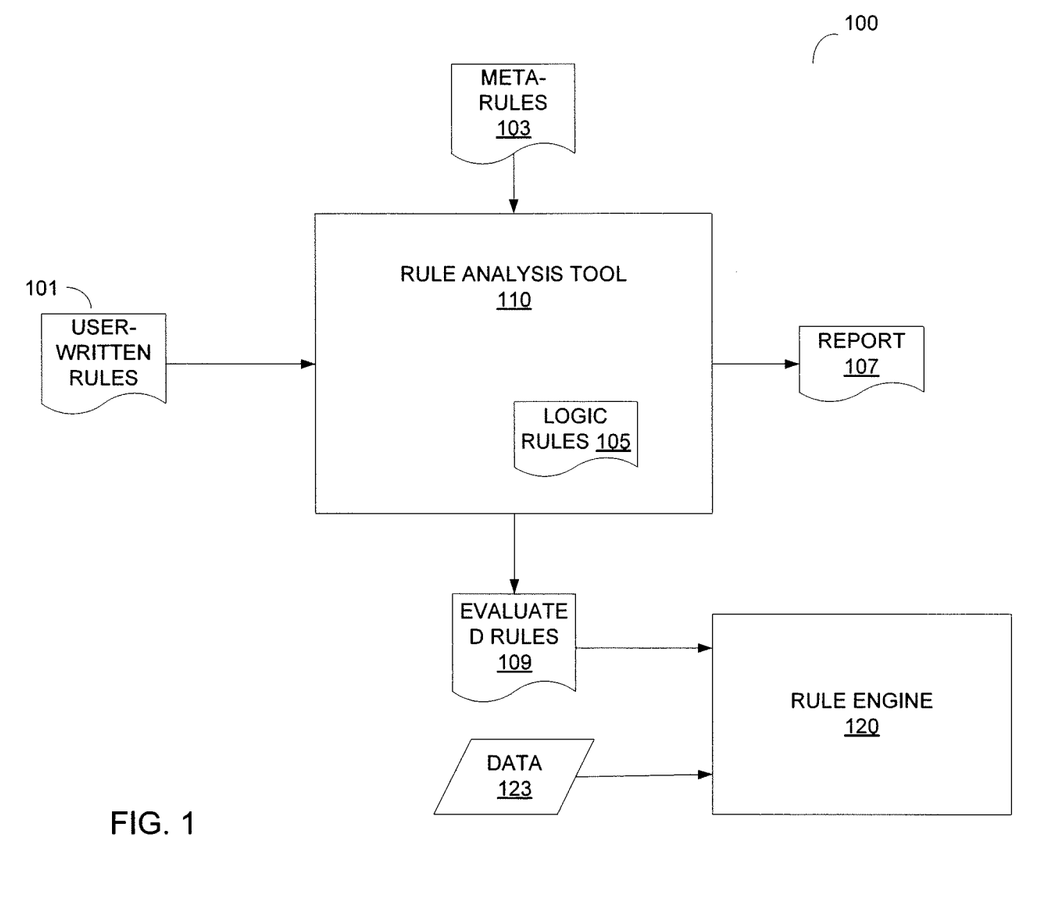
FIG. 1 illustrates one embodiment of a system to analyze and process rules.

FIG. 1 illustrates one embodiment of a system to analyze and process rules. The system 100 includes a rule analysis tool 110 and a rule engine 120. In some embodiments, the rule analysis tool 110 and the rule engine 120 are implemented by general-purpose computing systems, which retrieve instructions from a computer-readable storage medium and execute the instructions to perform various tasks and functions of the rule analysis tool 110 and the rule engine 120. Alternatively, the rule analysis tool 110 and the rule engine 120 may be implemented by hardware (e.g., special-purpose microcontrollers, field programmable gate array (FPGA), programmable logic devices (PLDs), etc.). One embodiment of the rule analysis tool 110 is illustrated in details in FIG. 2.

In general, the rule analysis tool 110 may evaluate rules written by users to provide quality assurance on the user-written rules. For instance, the rule analysis tool 110 may evaluate the user-written rules to ensure that they are logically sound and they comply with specific policies applicable to the users. In addition, the rule analysis tool 110 may further evaluate the efficiency of the rules, and/or identify any potential problems with the rules. In other words, the rule analysis tool 110 may be a diagnostic tool acting as a gatekeeper for the rule engine 120. To further illustrate the operations of the rule analysis tool 110 and the rule engine 120, one example is discussed in details below.

In some embodiments, a set of user-written rules 101 is input to the rule analysis tool 110. The rule analysis tool 110 may further receive a set of meta-rules 103 from the user or an administrator of the system 100. As previously mentioned, a rule is a logical construct for describing the operations, definitions, conditions, and/or constraints that apply to some predetermined data to achieve a goal. A meta-rule generally refers to a rule for making rules. The meta-rules 103 may include user-specific rules of one or more policies applicable to this particular user. In other words, the meta-rules 103 may be user-specific customized rules. For example, the meta-rules 103 may include rules according to Australian security regulation if the user is in Australia and the user-written rules are used for security trading in Australian market. Alternatively, the meta-rules 103 may include rules according to regulations promulgated by Security Exchange Commission (SEC) of the United States if the user is in the United States and the user-written rules are used for security trading in markets within the United States. Thus, the rule analysis tool 110 may apply the meta-rules 103 to the user-written rules 101 to screen for policy errors. The use of the meta-rules 103 allows the user to use customized rules to evaluate and check the user's own rules 101. In other words, the meta-rules 103 may guide or limit the development of the user-written rules 101 for a specific user. Furthermore, as many users are more proficient in writing rules than writing programming code, the use of meta-rules 103 provides a more user-friendly way for users to check user-written rules against specific policies that are applicable.

In addition to the meta-rules 103, the rule analysis tool 110 may have stored a set of predefined logic rules 105. Generally speaking, the predefined logic rules 105 are used to check for logic errors in the user-written rules 101. For example, user-written rules 101 that impose impossible constraints (e.g., stock priced above $10 and under $5) could violate the predefined logic rules 105 and be identified. Thus, the rule analysis tool 110 may apply the logic rules 105 to the user-written rules 101 to screen for logic errors. Note that the predefined logic rules 105 are not user-specific. In other words, these predefined logic rules 105 are applicable to various users in different circumstances.

In some embodiments, the rule analysis tool 110 further evaluates the user-written rules 101 to identify potential problems with the user-written rules 101. For example, a right hand side (RHS) of a network (e.g., a Rete network) constructed according to the user-written rules 101 may be missing for a rule, which may become a problem. Thus, the rule analysis tool 110 may issue a warning to alert the user about this. In addition, the rule analysis tool 110 may evaluate the efficiency of the user-written rules 101. For instance, rule analysis tool 110 may find an alternate way in which the user-written rules 101 can be re-written in order to shorten rule processing time.

After analyzing the user-written rules 101, the rule analysis tool 110 may generate a report 107 on the analysis. The report 107 may include logic errors found using the logic rules 105, policy errors found using the meta-rules 103, warnings of potential problems with the user-written rules 101, and/or notes that provide suggestions to improve the user-written rules 101. The report 107 may be output as a document in various formats (e.g., plain text, OpenText document, Portable Document Format (PDF), etc.), which can be printed as a hardcopy, stored at a designated location previously specified by the user, or transmitted to another computing system (e.g., via electronic mail to a designated electronic mail address). Alternatively, the report 107 may be in a format suitable for display via a graphical user interface (GUI), such as Hypertext Markup Language (HTML). For example, the report may be formatted in HTML and displayed via a web browser on a display device, which may be local or remote. Using the information in the report 107, the user may re-write the user-written rules 101 to correct the errors found and to improve the efficiency of the user-written rules 101. The user may also double-check the user-written rules 101 to determine if a potential problem identified is truly a problem.

In some embodiments, the rule analysis tool 110 may forward the user-written rules 109 evaluated to the rule engine 120 if there is no error found in the user-written rules 109. Data 123 (which may be asserted as facts) may be input to the rule engine 120, which can apply the rules 109 to process the data 123. Because the rules 109 have been checked using the rule analysis tool 110 already, the likelihood of the rule engine 120 having problem in processing the rules 109 is greatly reduced.

Figure 2:
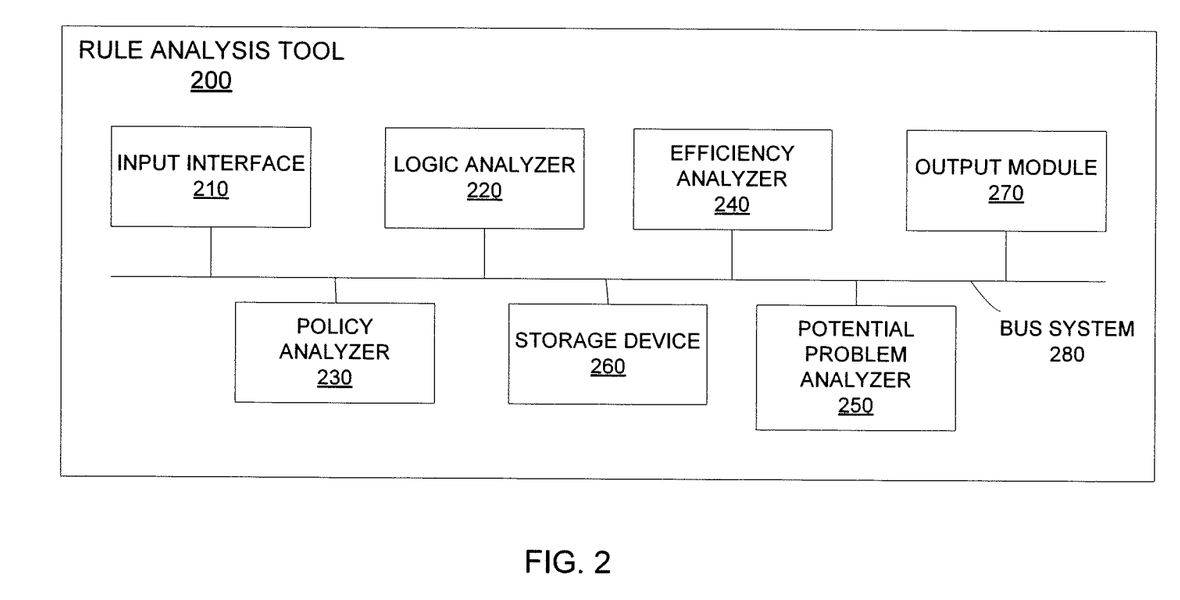
FIG. 2 illustrates one embodiment of a rule analysis tool.

FIG. 2 illustrates one embodiment of a rule analysis tool. The rule analysis tool 200 includes an input interface 210, a logic analyzer 220, a policy analyzer 230, an efficiency analyzer 240, a potential problem analyzer 250, a storage device 260, and an output module 270, which are coupled to each other via a bus system 280.

In some embodiments, the input interface 210 receives user-written rules. The input interface 210 may further receive meta-rules. For instance, the input interface 210 may create a GUI to allow users to input the user-written rules and/or meta-rules via text fields. Alternatively, the GUI may include drop-down list of operators (e.g., ">", "<=", "=", etc.) for users to choose from, text fields for users to enter variable names, numeric values, etc., and user interface control (e.g., buttons) to allow users to compose rules and enter the rules composed via the GUI. In one alternate embodiment, the input interface 210 may create a command line interface to allow users to input a filename and a path of a file containing the user-written rules or meta-rules. Using the filename and the path, the rules can be retrieved from the file. As previously discussed, the meta-rules may include user-specific evaluation rules according to policies applicable to a certain group of users.

In some embodiments, the storage device 260 further stores one or more logic rules generally applicable to all rules. In other words, the logic rules are non-user specific. Further, the logic rules may be updated from time to time. For example, updates to the logic rules may be input via the input interface 210 and then stored in the storage device 260. The storage device 260 may be implemented with one or more computer-readable storage media, such as, for example, RAMs, ROMs, EPROMs, flash memory cards, CD-ROMs, etc.

Once a set of user-written rules is received via the input interface 210, the logic analyzer 220 may retrieve the logic rules from the storage device 260 and apply the logic rules to the user-written rules. Based on the logic rules, logic errors (e.g., inconsistent rules, impossible constraints, etc.) in the user-written rules can be found. In addition, the policy analyzer 230 may apply meta-rules received via the input interface 210 to further evaluate the user-written rules. The policy analyzer 230 may find policy errors in the user-written rules. For example, the meta-rules may include rules according to security regulations in the United States that forbid short-selling of securities within a certain time period. A user-written rule allowing short-selling of securities within the time period would be flagged as a policy error.

In some embodiments, the efficiency analyzer 240 further evaluates the user-written rules to determine if any improvement in efficiency can be achieved. For example, the efficiency analyzer 240 may find an alternate way to order or organize the user-written rules, which would allow a rule engine processing these rules to run faster. In another example, the efficiency analyzer 240 may find a way to re-write the user-written rules to allow the rule engine to process these rules faster.

In some embodiments, the potential problem analyzer 250 further evaluates the user-written rules to identify any potential problems in the user-written rules. Note that the potential problems are not errors, unlike the logic error and policy error discussed above. But nevertheless, the potential problems may cause the user-written rules to behave incorrectly under certain circumstances. Therefore, the potential problem analyzer 250 may flag these potential problems to warn users.

After evaluating the user-written rules, the output module 270 may collect the results from the logic analyzer 220, the policy analyzer 230, the efficiency analyzer 240, and the potential problem analyzer 250, and thus, put the results into a report. The report may include logic errors found, policy errors found, warnings of potential problems, and notes to suggest improvement to the user-written rules. The output module 270 may generate the report in different formats, such as a document (e.g., in plaintext, in PDF, etc.), a webpage (e.g., in HTML), etc. Using the information in the report, the user may re-write the rules to remove errors and/or to improve efficiency of the rules.

Figure 3A:
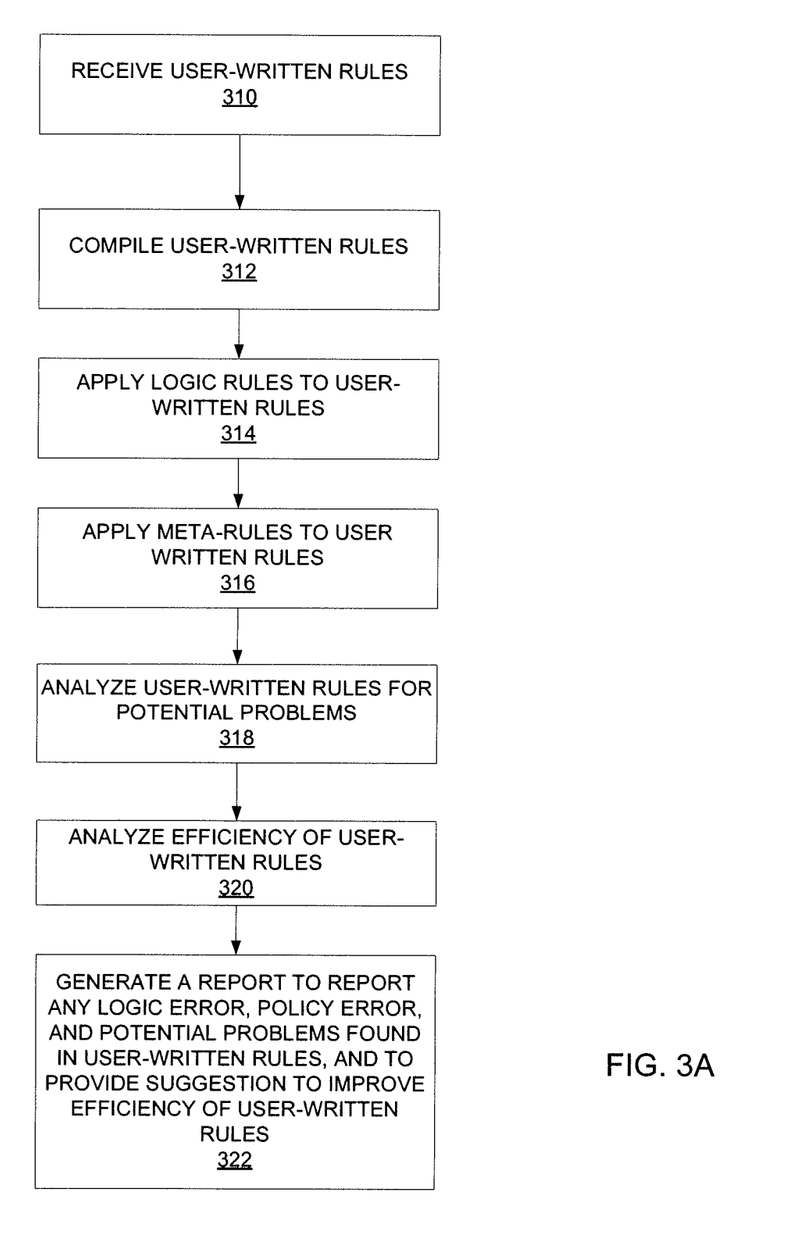
FIG. 3A illustrates a flow diagram of one embodiment of a method to analyze rules.

FIG. 3A illustrates a flow diagram of one embodiment of a method to analyze rules. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the logic analyzer 220 and the policy analyzer 230 of the rule analysis tool 200 illustrated in FIG. 2 in some embodiments.

Initially, processing logic receives user-written rules from a user (processing block 310). The rules may be provided via an input GUI, in a file, etc. Then processing logic compiles the user-written rules (processing block 312). Next, processing logic applies logic rules to the user-written rules (processing block 314). Using the logic rules, processing logic may find logic errors in the user-written rules. Note that the logic rules are generally non-user specific.

In some embodiments, processing logic applies meta-rules to the user-written rules (processing block 316). The meta-rules may include user-specific rules drafted according to specific policies that are applicable to this user. Using the meta-rules, processing logic may find policy errors in the user-written rules. Then processing logic analyzes the user-written rules for potential problems (processing block 318). Processing logic may further analyze the efficiency of the user-written rules (processing block 320).

Finally, processing logic generates a report with the results of the above analysis (processing block 322). The report may include logic errors, policy errors, and potential problems found in the user-written rules. The report may further include notes to provide suggestion to improve the efficiency of the user-written rules. The report may be output in various formats, such as a document (e.g., plaintext, OpenText format, PDF, etc.), or a webpage (e.g., HTML). Some embodiments of the report are shown in FIGS. 3B and 3C.

Figure 3B:
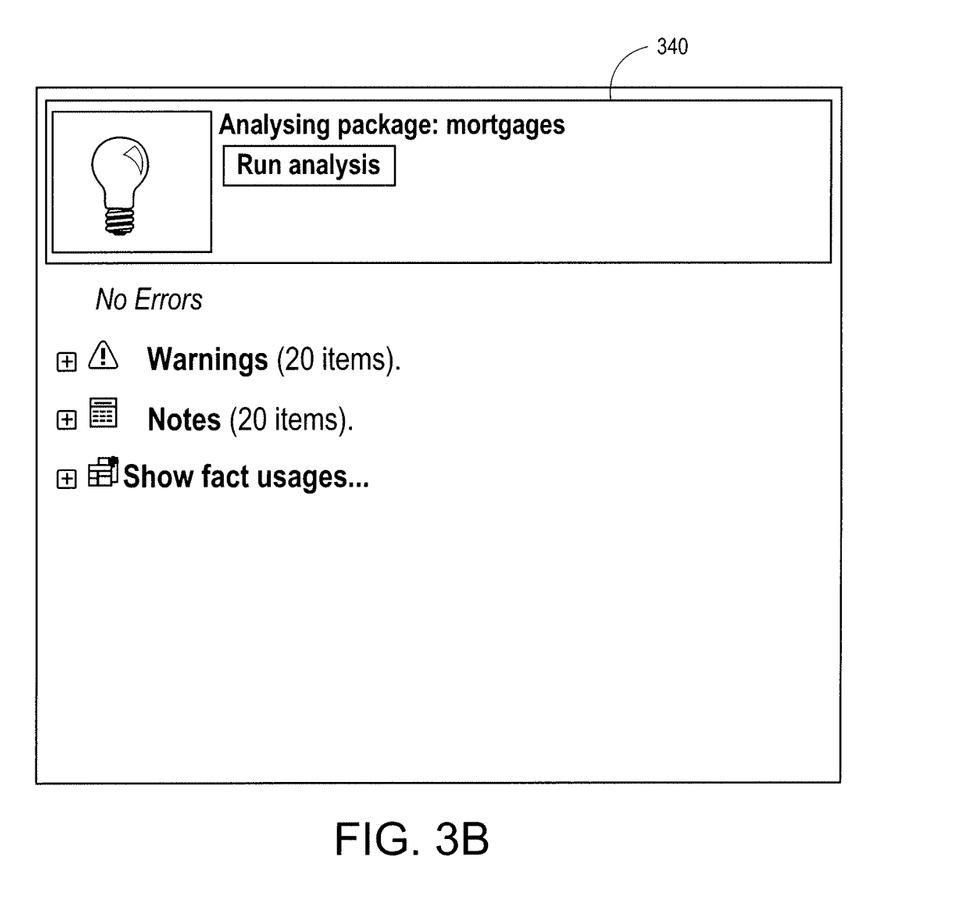
FIG. 3B illustrates one embodiment of an output report.

FIG. 3B illustrates one embodiment of an output report. The output report 340 contains the evaluation results of rules written for mortgage analysis. In the report 340, there is no logic error or policy error found in the rules. But there are twenty (20) warnings on potential problems in the rules, and 20 notes to suggest potential improvements to the rules. The sections of warnings and notes can be further expanded in a display of the report 340 to show details of the warnings and the notes as shown in FIG. 3C.

Figure 3C:
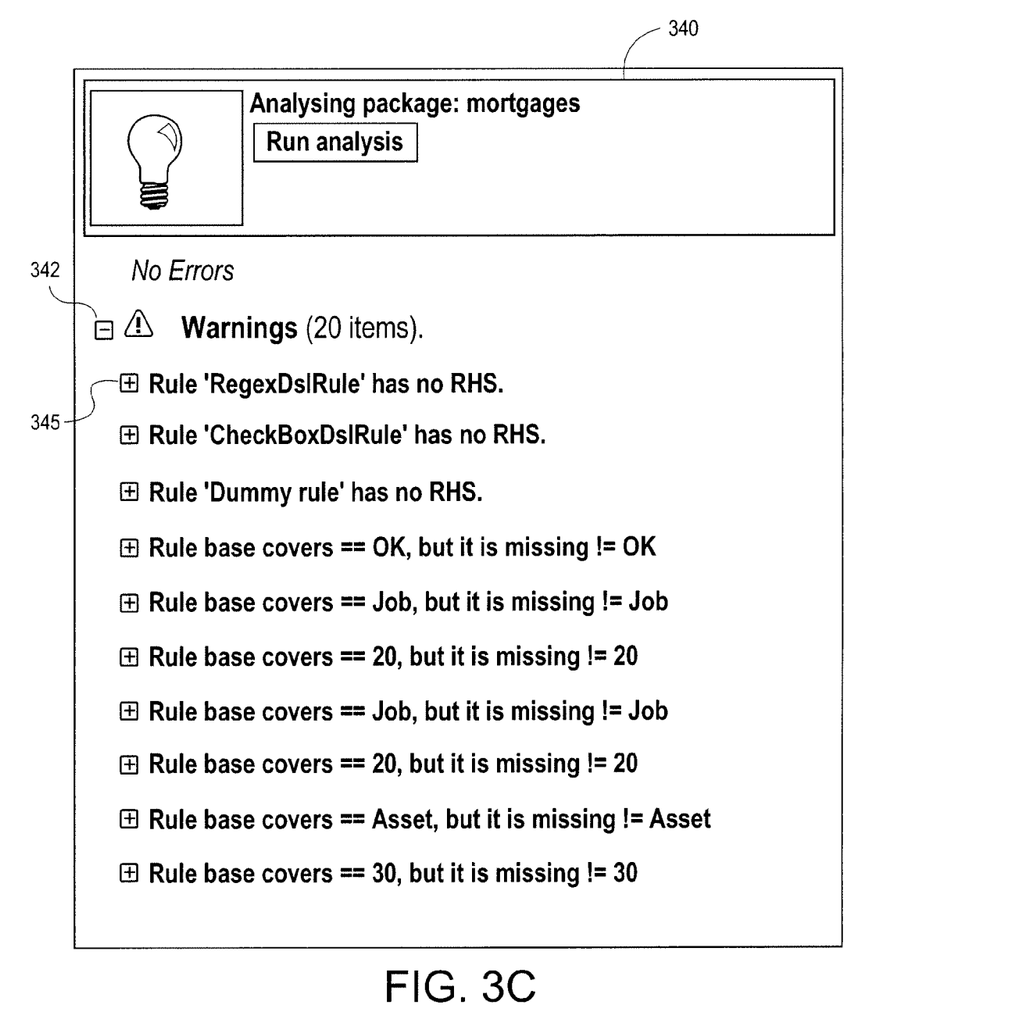
FIG. 3C illustrates another embodiment of an output report.

In FIG. 3C, the warning section in the report 340 is expanded by a user actuating the user interface control 342 to the left of the line "Warnings (20 items)." Details of each warning is shown, such as "'Rule RegexDslRule' has no RHS," which may be further expanded to show additional details of this warning. For example, a user may actuate the user interface control 345 to the left of this warning to expand it to show the additional details.

Figure 3D:
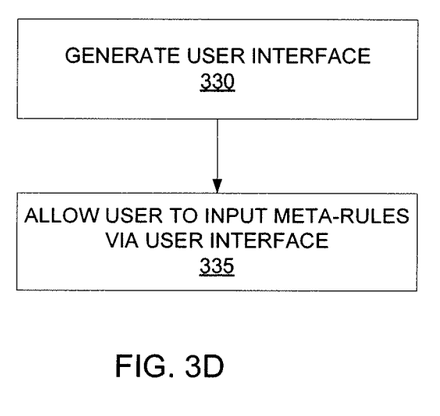
FIG. 3D illustrates a flow diagram of one embodiment of a method to receive user-specific meta-rules.

FIG. 3D illustrates a flow diagram of one embodiment of a method to receive user-specific meta-rules. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the input interface 210 illustrated in FIG. 2 in some embodiments.

Initially, processing logic generates a user interface (processing block 330). The user interface may include a command line interface (CLI), a GUI, etc. Processing logic allows users to input meta-rules via the user interface (processing block 335). For example, in the CLI, a user may type in a path and a file name of a file containing the meta-rules. Alternatively, the GUI may include a drop-down list of operators (e.g., ">", "<=", "=", etc.) for users to choose from, text fields for users to enter variable names, numeric values, etc., and user interface control (e.g., buttons) to allow users to compose rules and enter the rules composed via the GUI.

Using the above approach, users can provide user-specific meta-rules to a rule analysis tool (such as the rule analysis tool 110 in FIG. 1), which can apply the meta-rules to check user-written rules. Because many users are generally more comfortable with composing rules than writing programming code, this approach provides a easy and user-friendly way for users to create a customized rule analysis tool for checking their own rules.

Figure 4:
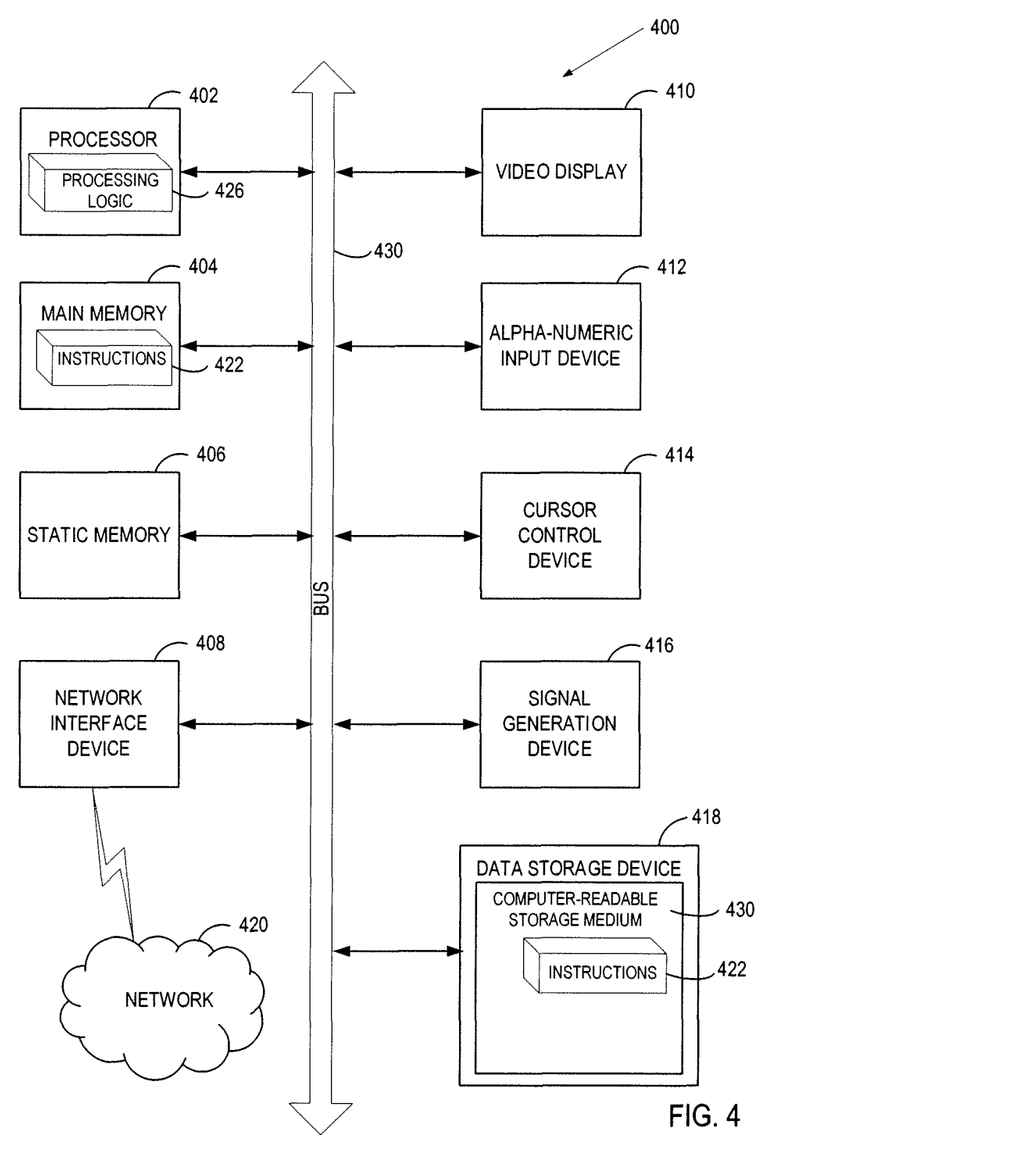
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a rule analysis tool have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a user interface of a rule analysis tool executing on a processing device, a user-written rule;
applying, by the rule analysis tool, a predefined evaluation rule to the user-written rule, wherein the predefined evaluation rule consists of a logic rule and a meta-rule, wherein the meta-rule is a user-specific rule associated with a security regulation policy;
analyzing, by the rule analysis tool, an efficiency of the user-written rule, wherein the analyzing generates at least one of: a rewritten version of the user-written rule, a reordered version of the user-written rule, or a reorganized version of the user-written rule; and
generating, by the rule analysis tool, an evaluation report on the user-written rule in view of the applying and the analyzing.

2. The method of claim 1, wherein the user-written rule is written by the user.

3. The method of claim 1, further comprising:
receiving the meta-rule, wherein the meta-rule is defined by a user; and
retrieving the logic rule from a storage device, wherein the logic rule is non-user specific.

4. The method of claim 1, further comprising:
generating a graphical user interface (GUI) to allow a user to enter the meta-rule associated with the security regulation policy; and
applying the meta-rule to the user-written rule to identify a constraint imposed by the rule that is inconsistent with the security regulation policy.

5. The method of claim 1, further comprising:
analyzing a plurality of constraints of the user-written rule in view of the logic rule to identify an impossible constraint imposed by the user-written rule.

6. The method of claim 1, further comprising:
displaying the evaluation report via a graphical user interface (GUI), wherein the evaluation report comprises at least one of a logic error found in the user-written rule according to the logic rule or a policy error found in the user-written rule according to the meta-rule.

7. The method of claim 1, wherein the evaluation report comprises a warning of a potential problem in the user-written rule, and a note to suggest a potential improvement to the user-written rule.

8. The method of claim 1, wherein the evaluation report comprises a note to suggest a potential improvement to the user-written rule.

9. An apparatus comprising:
a rule analysis tool executed by a processing device to apply a predefined evaluation rule to a user-written rule and to analyze an efficiency of the user-written rule, wherein the predefined evaluation rule consists of a logic rule and a meta-rule, wherein the meta-rule is a user-specific rule associated with a security regulation policy, and wherein the analyzing generates at least one of: a rewritten version of the user-written rule, a reordered version of the user-written rule, or a reorganized version of the user-written rule; and
an output module to generate an evaluation report on the user-written rule in view of the applying and the analyzing.

10. The apparatus of claim 9, wherein the user-written rule is written by the user.

11. The apparatus of claim 9, further comprising:
a storage device to store the logic rule, wherein the logic rule is non-user specific, wherein the user interface further receives the meta-rule from a user, wherein the meta-rule is defined by the user.

12. The apparatus of claim 9, further comprising:
a graphical user interface (GUI) module to generate a GUI to allow a user to enter the meta-rule associated with the security regulation policy; and
a policy analyzer to apply the meta-rule to the user-written rule to identify a constraint imposed by the user-written rule that is inconsistent with the security regulation policy.

13. The apparatus of claim 9, further comprising:
a logic analyzer to analyze a plurality of constraints of the user-written rule in view of the logic rule to identify an impossible constraint imposed by the user-written rule.

14. The apparatus of claim 9, wherein the output module is to display the evaluation report via a graphical user interface (GUI), wherein the evaluation report comprises at least one of a logic error found in the user-written rule according to the logic rule or a policy error found in the user-written rule according to the meta-rule.

15. The apparatus of claim 9, wherein the evaluation report comprises a warning of a potential problem in the user-written rule, and a note to suggest a potential improvement to the user-written rule.

16. The apparatus of claim 9, wherein the evaluation report comprises a note to suggest a potential improvement to the user-written rule.

17. A non-transitory computer-readable storage medium embodying instructions that, when executed by a processing device, will cause the processing device to perform operations comprising:
receiving, by a user interface of a rule analysis tool executing on the processing device, a user-written rule;
applying, by the rule analysis tool, a predefined evaluation rule to the user-written rule, wherein the predefined evaluation rule consists of a logic rule and a meta-rule, wherein the meta-rule is a user-specific rule associated with a security regulation policy;
analyzing, by the rule analysis tool, an efficiency of the user-written rule, wherein the analyzing generates at least one of: a rewritten version of the user-written rule, a reordered version of the user-written rule, or a reorganized version of the user-written rule;
generating, by the rule analysis tool, an evaluation report on the user-written rule in view of the applying and the analyzing.

18. The non-transitory computer-readable storage medium of claim 17, wherein the user-written rule is written by a user.

19. The non-transitory computer-readable storage medium of claim 17, further comprising:
receiving the meta-rule from a user, wherein the meta-rule is defined by the user; and
retrieving the logic rule from a storage device, wherein the logic rule is non-user specific.

20. The non-transitory computer-readable storage medium of claim 17, further comprising:
generating a graphical user interface (GUI) to allow a user to enter the meta-rule associated with the security regulation policy; and
applying the meta-rule to the user-written rule to identify a constraint imposed by the user-written rule that is inconsistent with the security regulation policy.

21. The non-transitory computer-readable storage medium of claim 17, further comprising:
analyzing a plurality of constraints of the user-written rule in view of the logic rule to identify an impossible constraint imposed by the user-written rule.

22. The non-transitory computer-readable storage medium of claim 17, wherein the operations further comprise:
displaying the evaluation report via a graphical user interface (GUI), wherein the evaluation report comprises at least one of a logic error found in the user-written rule according to the logic rule or a policy error found in the user-written rule according to the meta-rule.

23. The non-transitory computer-readable storage medium of claim 17, wherein the evaluation report comprises a warning of a potential problem in the user-written rule, and a note to suggest a potential improvement to the user-written rule.

24. The non-transitory computer-readable storage medium of claim 17, wherein the evaluation report comprises a note to suggest a potential improvement to the user-written rule.

* * * * *